United States Patent [19]
Martus et al.

[11] Patent Number: 5,216,808
[45] Date of Patent: Jun. 8, 1993

[54] METHOD FOR MAKING OR REPAIRING A GAS TURBINE ENGINE COMPONENT

[75] Inventors: James A. Martus, West Chester; Paul P. Mehta; Seetharamaiah Mannava, both of Cincinnati, all of Ohio

[73] Assignee: General Electric Company, Cincinnati, Ohio

[21] Appl. No.: 806,745

[22] Filed: Dec. 13, 1991

Related U.S. Application Data

[63] Continuation-in-part of Ser. No. 614,367, Nov. 13, 1990, Pat. No. 5,113,582.

[51] Int. Cl.$^5$ ............................................. B23P 15/04
[52] U.S. Cl. .................................. 29/889.1; 29/889.2; 29/889.71
[58] Field of Search .............. 29/889.2, 889.7, 889.71, 29/889.1; 416/241 R, 224; 219/121.61, 121.66, 121.69, 121.72

[56] References Cited

U.S. PATENT DOCUMENTS

| | | | |
|---|---|---|---|
| 3,440,388 | 4/1969 | Otstot et al. | 219/69 |
| 3,503,804 | 3/1970 | Schneider | 131/1 |
| 3,588,439 | 6/1971 | Heller et al. | 219/121 |
| 3,657,510 | 4/1972 | Rothrock | 219/121 |
| 3,837,198 | 9/1974 | Higgins | 29/889.7 |
| 4,063,063 | 12/1977 | Funck et al. | 219/121 |
| 4,125,757 | 11/1978 | Ross | 219/121 |
| 4,128,752 | 12/1978 | Gravel | 219/121 |
| 4,156,124 | 5/1979 | Macken et al. | 219/121 |
| 4,214,355 | 7/1980 | Zelahy | 29/889.1 |
| 4,219,721 | 8/1980 | Kamen et al. | 219/121 |
| 4,250,374 | 2/1981 | Tani | 219/121 |
| 4,319,122 | 3/1982 | Pope et al. | 219/121 |
| 4,324,972 | 4/1982 | Furrer et al. | 219/121 |
| 4,328,410 | 5/1982 | Slivinsky et al. | 219/121 |
| 4,368,080 | 1/1983 | Langen et al. | 134/1 |
| 4,390,320 | 6/1983 | Eiswerth | 29/889.1 |
| 4,617,085 | 10/1986 | Cole, Jr.; et al. | 156/643 |
| 4,720,621 | 1/1988 | Langen | 219/121 |
| 4,726,104 | 2/1988 | Foster et al. | 29/889.1 |
| 4,756,765 | 7/1988 | Woodroffe | 134/1 |
| 4,808,055 | 2/1989 | Wertz et al. | 29/889.1 |

OTHER PUBLICATIONS

Lambda Physik, Hans-Boeckler-Strasse 12, D-3400 Goettingen, West Germany, Material Processing with Excimer Lasers.
Lambda Physik, Lambda Lasers, The UV-Tool for Industrial Applications (Marketing Brochure).
Lambda Physik, Excimer Lasers with Magnetic Switch Control.
Lambda Physik Highlights Nos. 1; 2; 3; 6, pp. 4; 7; Oct. 1986 to Oct. 1987.
Lambda Physik Industrial Report No. 4, Excimer Laser Material Processing—Methods and Results, Oct. 1988.
Lambda Physik Industrial Report No. 6, Excimer Laser Processing of Ceramic Workpieces, Jun. 1989.
Proceedings of Inter. Society for Optical Engineering, vol. 998, J. Sercel et al., Excimer Beam Applications, pp. 76-83, Sep. 6, 1988.
Society of Photo-Optical Instrumentation Engineers, vol. 1023, Excimer Lasers and Applications, 1988, pp. 141-152, 166-215, 236-241.

*Primary Examiner*—Irene Cuda
*Attorney, Agent, or Firm*—Charles L. Moore, Jr.; Jerome C. Squillaro

[57] ABSTRACT

A method for making or repairing a gas turbine engine component includes the step of directing a pulsed ultraviolet laser beam on a location of a film cooling hole after application of a thermal barrier coating to athermally remove any coating material which may be obstructing the cooling hole without damaging the engine component or removing any of the coating from the surface of the component around the cooling hole.

18 Claims, 3 Drawing Sheets

METHOD FOR MAKING OR REPAIRING A GAS TURBINE ENGINE COMPONENT

RELATIONSHIP TO OTHER APPLICATIONS

The present application is a continuation-in-part of co-pending patent application Ser. No. 07/614,367, now U.S. Pat. No. 5,113,582 filed Nov. 13, 1990, entitled "Method for Making a Gas Turbine Engine Component", allowed Sep. 17, 1991, and assigned to the same assignee as the present invention.

BACKGROUND OF THE INVENTION

The present invention relates to fabrication and repair of gas turbine engine components and the like, and more particularly, to a novel method for opening partially or substantially completely blocked film cooling holes in a gas turbine engine component or the like, after application of a thermal barrier coating (TBC).

Static and dynamic components of a gas turbine engine which operate in a hot section of the engine are typically coated with a thick coating of the thermal barrier type, such as Zirconia oxide or the like. The thickness of the thermal barrier coating is currently limited or restricted because thicker application of the coating can result in full or partial closure of the cooling holes formed in some gas turbine engine components, particularly those located in the hot section of the engine, to extend the operating life of the component and to prevent heat damage to the component during engine operation.

Referring to FIG. 1, as an example of a gas turbine engine component having film cooling holes formed therein and also being coated with a TBC, a gas turbine engine blade or airfoil 10 is shown having a multiplicity of cooling channels or holes 12 formed therein to permit cooling of the blade during engine operation. The cooling holes 12 extend from an exterior surface 14 of blade 10 into a hollow interior 16 or plenum of the blade 10. The blade hollow interior includes a plurality of interior walls 18 or baffles to direct cooling air indicated by arrows 20, through the interior of blade 10 and out cooling holes 12 to create cooling air streams, indicated by arrows 22. Cooling air 20 absorbs heat within the interior 16 of blade 10 and also from the walls surrounding cooling holes 12 and the cooling air streams 22 exiting cooling holes 12 flow over the exterior surface 14 to further cool the blade 10.

In order to function properly, the cooling holes 12 must be constructed to a specified configuration and dimensions because the distribution of air flow must be controlled to achieve proper cooling of the blade 10 during engine operation. Thus, the cooling holes 12 must not be blocked or even partially blocked to provide sufficient and uniform cooling air distribution through the blade interior 16 and across the exterior 14 of blade 10. Application of a TBC with a thickness of about 5 mils or more can result in a significant reduction in air flow through cooling holes 12 and a TBC thickness of about 15 mils or more can result in complete closure of the cooling holes 12. Therefore, to apply a TBC coating of more than about 5 mils, at least some of the cooling holes 12 may have to be opened to their original specified dimensions to provide proper cooling of the component 10 and the holes 12 must be opened without causing damage to the parent material of the component 10 or to the TBC in areas other than where it is desired to remove the TBC.

The present invention accomplishes the removal of the TBC in desired areas by use of an Excimer laser (ultraviolet laser).

The use of Excimer lasers for material processing, such as micro-machining and deposition of metallic and insulator films is described in marketing and technical literature published by Lambda Physik GmbH, a leading manufacturer of Excimer lasers, whose address is Hans Bockler-Str. 12, D-3400 Gottingen, Federal Republic of Germany, and in U.S. Pat. Nos. 4,617,085; 4,756,785; 4,720,621; 4,368,080; 4,328,410; 4,219,721; and 4,128,752. None of these documents recognize the specific problems, as mentioned hereinabove, associated with the removal of TBC material from the cooling holes of a gas turbine engine component or suggest the solution as provided by the present invention.

Other presently known material processing methods, such as abrasive grit drilling, Nd:YAG laser drilling, $CO_2$ laser drilling, water jet drilling and the like, have disadvantages which make them inappropriate for use in opening cooling holes. Abrasive grit drilling is slow and inefficient in a high capacity production environment and may present control problems in drilling a precise opening with minimal damage to surrounding areas. YAG and $CO_2$ laser drilling involves thermal removal of the material which can result in damage to the parent material of the component and to the TBC material surrounding the cooling hole being opened. Water jet drilling is also difficult to precisely control to open the cooling hole and avoid damage to the component.

SUMMARY OF THE INVENTION

It is accordingly a primary object of the present invention to provide a novel method for opening film cooling holes of a gas turbine engine component which is not subject to the foregoing disadvantages.

It is another object of the present invention to provide an automatable method for opening the cooling holes of a gas turbine engine component which utilizes the original computer numerical control part program or machine tool path data to open partially or completely blocked cooling holes in a gas turbine engine component.

It is a further object of the present invention to provide a method for opening blocked cooling holes to the design specification dimensions without damage to the parent material or the TBC in areas where it is not desired to remove the coating.

In accordance with the present invention, a method for removing an obstruction from a cooling hole of a gas turbine engine component includes the step of directing a pulsed ultraviolet laser beam on the obstruction to athermally remove the obstruction without damaging the engine component.

In a further embodiment of the present invention, a method for manufacturing a gas turbine engine component includes the steps of: forming a plurality of cooling holes in the gas turbine engine component; depositing a thermal barrier coating material with a selected thickness on a chosen surface of the gas turbine engine component; and redrilling any obstructed cooling holes by directing a pulsed ultraviolet laser beam on the obstruction to athermally remove the obstruction to provide a cooling hole with substantially the same dimensions as originally formed without damaging the engine component or removing the thermal barrier coating from the surface of the gas turbine engine component surrounding the cooling hole and without altering the original design geometry or configuration of the cooling hole.

Other objects of the invention, together with features and advantages thereof, will become apparent from the following detailed specification when read with the accompanying drawings in which like reference numerals refer to like elements.

DETAILED DESCRIPTION OF THE PREFERRED EMBODIMENTS

Figure 1:
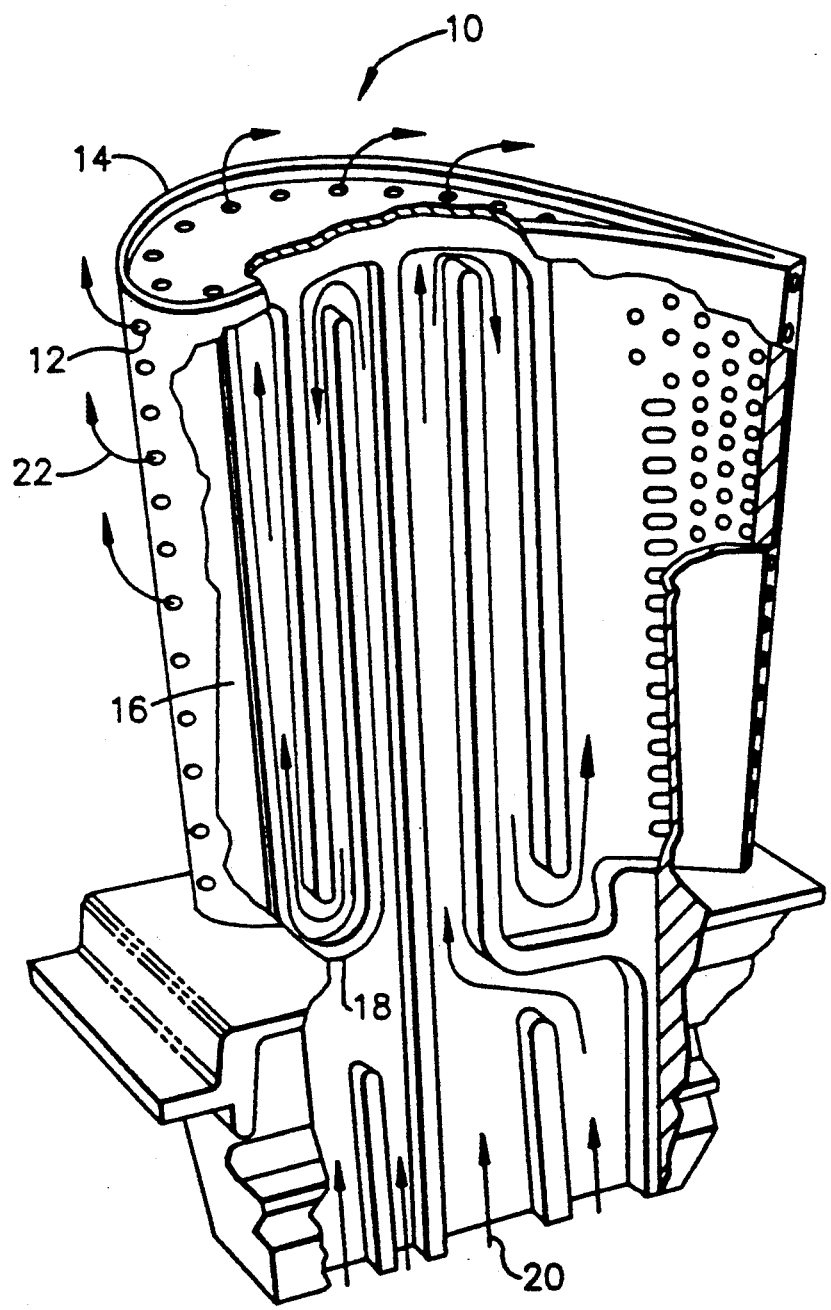
FIG. 1 is a perspective, partial cutaway view of a conventional gas turbine engine blade.
Figure 2:
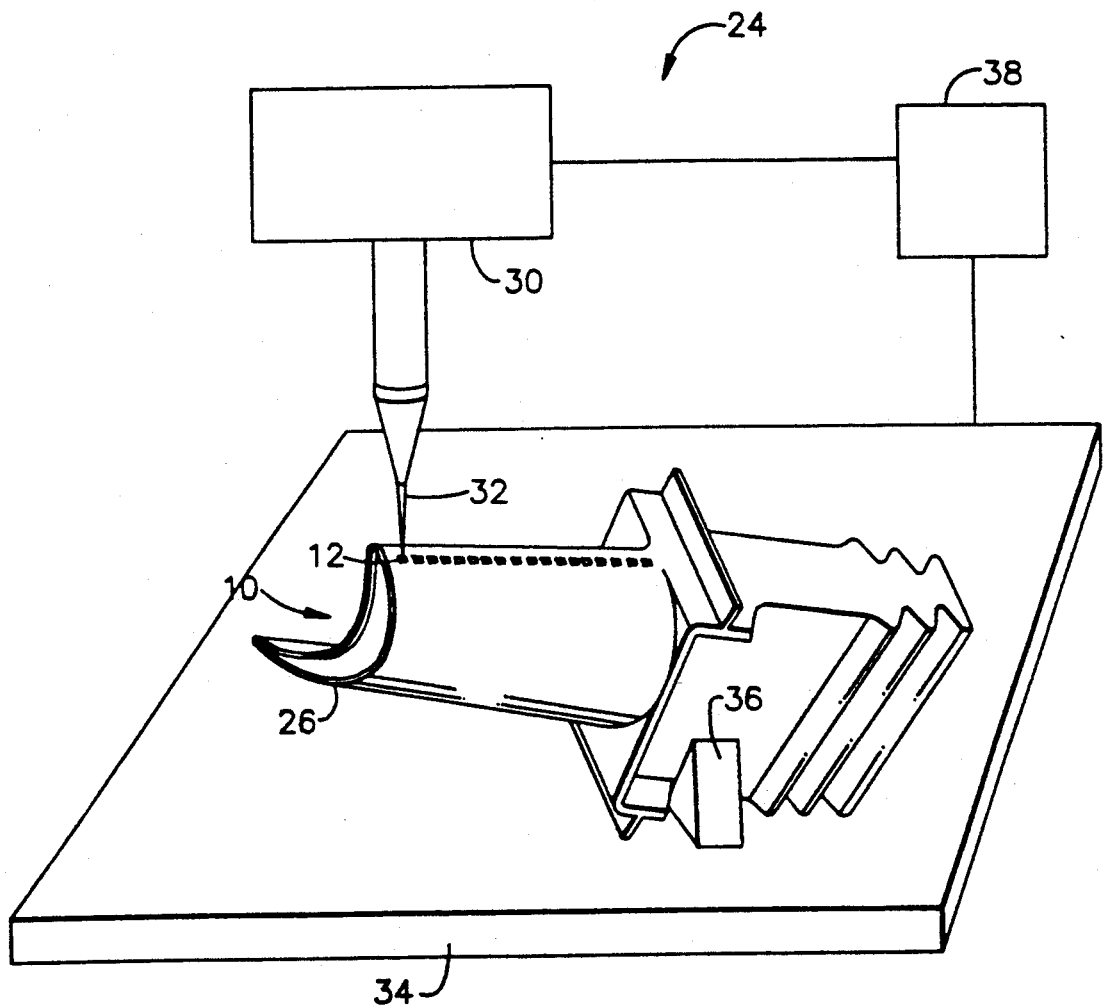
FIG. 2 is a schematic diagram of an apparatus for opening blocked cooling holes in accordance with the method of the present invention.

Referring to FIG. 2, a schematic diagram is shown of an apparatus 24 for removing an obstruction or TBC material from a cooling hole 12 or the like of a gas turbine engine component 10 or similar workpiece. During the manufacturing process or repair of a gas turbine engine component 10, the component may be completely or partially coated with a ceramic layer or coating 26 of the thermal barrier type (TBC), such as Zirconia oxide or the like. The TBC 26 may be applied by plasma spray, physical vapor deposition (PVD) or similar type coating method. During the application of the TBC, the cooling holes 12 may become completely or partially blocked by the ceramic material.

In accordance with the present invention, the apparatus 24 for removing TBC material which may have obstructed any or all of cooling holes 12 during the deposition of the coating 26 includes an Excimer or ultraviolet laser device 30 for directing a pulsed laser beam 32 on the location of the cooling hole 12 to athermally (without heat) remove or clean-out the TBC obstruction without deforming or damaging the component 10 or altering the design geometry or configuration of the cooling hole 12. The Excimer laser is non-damaging because it removes material by photo-ablation as opposed to a photo-thermal process as used by most other industrial-type lasers, such as the YAG laser.

Laser beam 32 is pulsed with each pulse having a pulse width between about 1 and about 100 nanoseconds, preferably about 20 nanoseconds, and a wavelength between about 190 and about 350 nanometers. The wavelength may be selected by choosing the lasing gas mixture; for example, an argon fluoride mixture will provide a wavelength of about 193 nanometers and a krypton fluoride mixture will provide a wavelength of about 248 nanometers. The short wavelength is selected to provide a high photon energy which causes ablation of the TBC material or other obstruction within the cooling hole 12. The power density of the laser beam may be between about 0.5 joules/sq.cm. and about 100 joules/sq.cm., depending upon the type of TBC material or other material being removed.

Excimer laser apparatus 30 may be mounted vertically or horizontally and the component 10 may be mounted on a multi-axis computer numerical controlled (CNC) table 34 or similar programmable component positioning mechanism, such as an industrial robot, for positioning and moving the component 10 relative to the laser apparatus 30 to focus the laser beam 32 on any partially or completely blocked cooling holes 12 for athermal removal of the obstruction. In accordance with the present invention, the CNC table 34 is programmed with the original CNC part program data or tool path data which was used to originally drill or form cooling holes 12 except that the program may be modified or compensated to take into account the coating 26 thickness to basically redrill the cooling holes 12. The cooling holes 12 may be originally drilled or formed using an Nd:YAG type laser or similar high power industrial laser, electrical discharge machining (EDM), electro-chemical machining (ECM) or the like.

Figure 3:
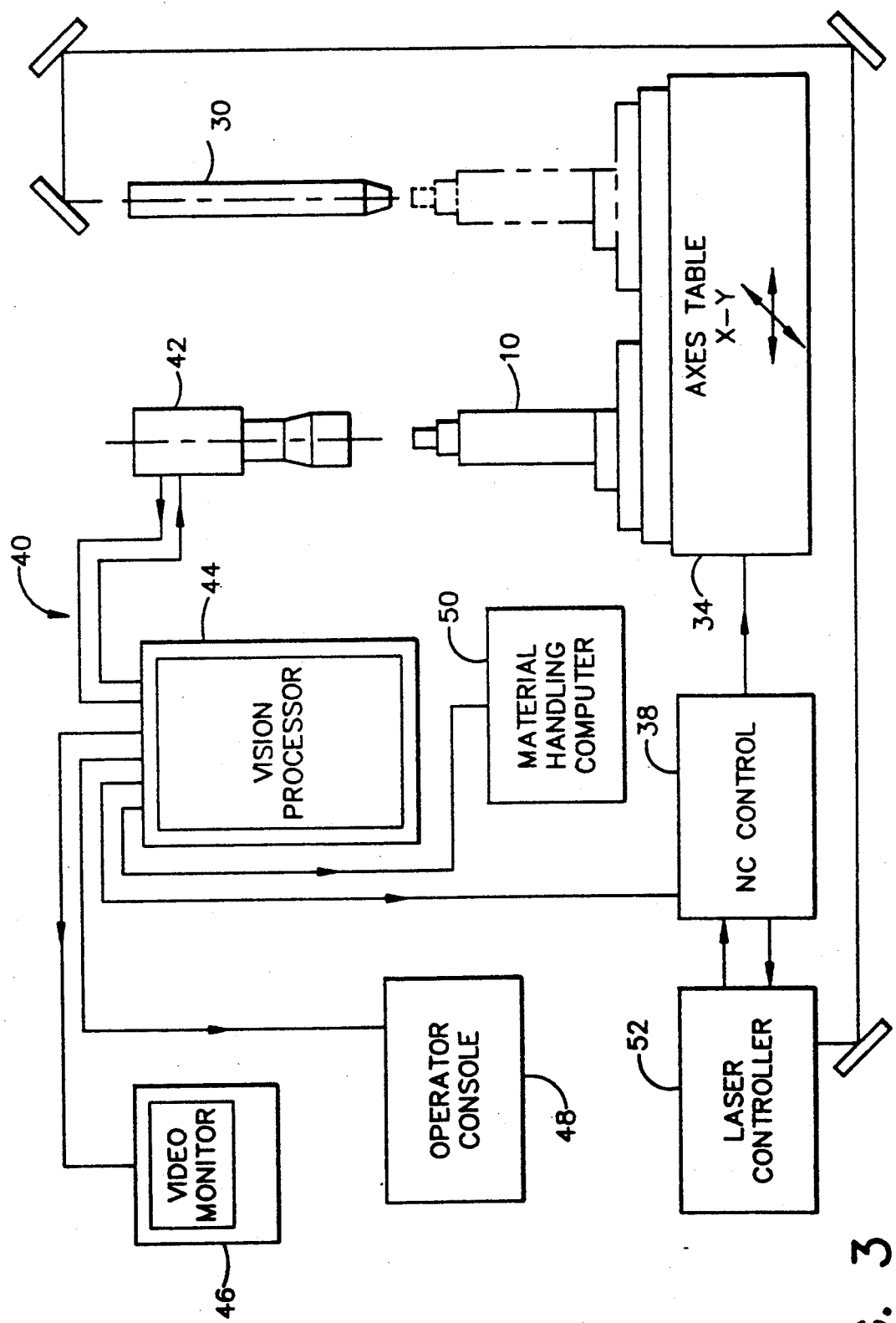
FIG. 3 is a schematic diagram of a machine machine system.

Referring to FIG. 3, the Excimer laser apparatus 30 may also be used with any commercial machine vision system 40, such as the ones disclosed in U.S. Pat. Nos. 4,995,087 and 4,998,005, both entitled "Machine Vision System", assigned to the same assignee as the present invention and incorporated herein by reference in their entirety. The vision system 40 includes a camera 42, a vision processor 44, a video monitor 46, and an operator console 48. The scanning mechanism within camera 42 generates a video signal from an image of the component 10 and provides this signal to vision processor 44. The vision processor 44, which may be an International Robomation/Intelligencee model DX/VR vision computer, will determine the laser drilling parameters, such as the drilling location, the laser power intensity, dwell, pulse width, pulse frequency and the like. The vision processor 44 may interface with a material handling computer 50, a numerical controller 38, and a laser controller 52 to control laser operation, beam delivery and positioning of the component 10 under laser 30.

The monitor 46 permits viewing of the drilling process by a human operator. Console 48 allows the operator to communicate with the vision processor 44 and override or modify the vision system programming.

The CNC table 34 may include a fixture 36 for holding component 10 in position as the machine vision system or CNC table 34 moves each cooling hole 12, as required, into proper position, relative to the Eximer laser device 30, according to the compensated or modified original CNC part program to remove any obstructions in the cooling holes 12 or to redrill cooling holes 12 by generating laser beam 32 responsive to signals from the computer numerical controller 38.

It is also within the scope of the present invention to mount component 10 in a stationary fixture and to move the laser apparatus 30 relative to the component 10 using a suitable positioning mechanism, such as an industrial robot or the like, or both the component 10 and laser apparatus 30 may be moved relative to each other.

While the present invention has been described with respect to removing TBC material which may be obstructing a cooling hole 12 of a gas turbine engine blade, vane or the like, those skilled in the art will recognize that the method of the present invention may also be applied to deburr larger holes such as those generated by a laser trepanning operation similar to that described and claimed in co-pending application Ser. No. 07/764,256, filed Sep. 23, 1991, entitled: "An Improved Method and Apparatus for Laser Trepanning", and assigned to the same assignee as the present invention and incorporated herein by reference in its entirety.

The method of the present invention is equally applicable to removing TBC coatings or other coatings, bonded layers or other foreign material such as dirt, soot or the like, from the surface and from within cooling holes 12 of a gas turbine engine component to facilitate repair of those components. For example, a pulsed UV laser beam, with a selected wavelength in accordance with the material and thickness to be removed, may be applied to a chosen location on the surface of the component. The laser beam may then be scanned across a selected portion of the component surface to remove a layer of material to a selected depth. The scanning may be controlled by a CNC part program which was originally used to make the component and which has been modified to take into consideration the thickness of any coating or the depth to be removed. This method may be used to machine a component back to within design specifications after a layer of TBC material is applied during a repair operation.

It will be readily understood by those skilled in the art that the present invention is not limited to the specific embodiments described and illustrated herein. Different embodiments and adaptations besides those shown herein and described as well as many variations, modifications and equivalent arrangements will now be apparent or will be reasonably suggested by the foregoing specification and drawings, without departing from the substance or scope of the invention. While the present invention has been described herein in detail in relation to its preferred embodiments, it is to be understood that this disclosure is only illustrative and exemplary of the present invention and is made merely for purposes of providing a full and enabling disclosure of the invention. Accordingly, it is intended that the invention be limited only by the spirit and scope of the claims appended hereto.

What is claimed is:

1. A method for making a gas turbine engine component, comprising the steps of:
   (a) forming a plurality of cooling holes through a surface of the gas turbine engine component at selected locations thereof;
   (b) depositing a layer of thermal barrier coating (TBC) material with a chosen thickness on the surface of the component; and
   (c) removing any thermal barrier coating (TBC) material obstructing any of the plurality of cooling holes by directing a pulsed ultraviolet laser beam on the selected location of the obstructed hole to athermally remove the TBC material without damaging the component.

2. The method of claim 1, wherein the chosen thickness of the TBC layer is more than about 5 mils.

3. The method of claim 1, wherein step (c) comprises the step of employing an original CNC part program used to initially form each of the plurality of cooling holes in step (a) to remove any TBC material obstructing any of the plurality of cooling holes.

4. The method of claim 1, wherein step (c) comprises the step of positioning the component and a lasing means for generating the ultraviolet laser beam relative to one another responsive to a CNC part program used to originally form the cooling holes.

5. The method of claim 4, wherein the CNC part program is modified to compensate for the thickness of the TBC layer.

6. The method of claim 4, wherein at least one of the component and the lasing means are moved relative to one another by one of a CNC positioning device and a machine vision system to position the component and lasing means for removal of any TBC obstruction.

7. A method for removing an obstruction from a channel formed in a gas turbine engine component comprising the step of directing a laser beam on a location of the obstruction to athermally remove the obstruction without damaging the component.

8. The method of claim 7, wherein the laser beam is a pulsed UV laser beam having a selected wavelength.

9. The method of claim 7, further comprising the step of positioning the component and a lasing means relative to one another and generating the laser beam responsive to a CNC part program used to originally form the channel.

10. The method of claim 9, wherein the CNC part program is modified to compensate for a thickness of any coating deposited on the component.

11. A method for removing TBC material from a selected surface of a gas turbine engine component, comprising the steps of:
    applying a laser beam to a chosen location of the component; and
    moving at least one of the component and the laser beam relative to one another, in response to a CNC part program used to originally make the component, to cause the laser beam to scan across the selected surface to athermally remove at least a portion of the TBC material to bring the component within design specifications after a repair operation.

12. The method of claim 11, wherein the laser beam is a pulsed UV laser beam having a selected wavelength.

13. The method of claim 11, wherein at least one of the component and the laser beam are moved by one of a CNC positioning device and a machine vision system.

14. A method for repairing a gas turbine engine component, comprising the steps of:
    (a) providing a damaged gas turbine engine component; and
    (b) applying a laser beam on a surface of the engine component to athermally remove at least one layer of material.

15. The method of claim 14, wherein the at least one layer of material is one of a layer of soot, a thermal barrier layer, an oxide, a subassembly of the component and a layer of abradable material.

16. The method of claim 14, wherein the laser beam is a pulsed UV laser beam having a selected wavelength.

17. The method of claim 14, further comprising the step of moving at least one of the component and the laser beam relative to one another to cause the laser beam to scan the surface in a selected pattern to remove the at least one layer of material.

18. The method of claim 17, wherein at least one of the component and the laser beam are moved by one of a CNC positioning device and a machine vision system.

* * * * *